(12) United States Patent
Nakayama et al.

(10) Patent No.: US 7,227,537 B2
(45) Date of Patent: Jun. 5, 2007

(54) TOUCH PANEL

(75) Inventors: Naomi Nakayama, Toyama (JP); Takehiro Egami, Toyama (JP); Kazuo Imai, Toyama (JP); Takeshi Yago, Toyama (JP)

(73) Assignee: SMK Corporation, Tokyo (JP)

( * ) Notice: Subject to any disclaimer, the term of this patent is extended or adjusted under 35 U.S.C. 154(b) by 463 days.

(21) Appl. No.: 10/607,495

(22) Filed: Jun. 25, 2003

(65) Prior Publication Data

US 2004/0061688 A1    Apr. 1, 2004

(30) Foreign Application Priority Data

Sep. 30, 2002    (JP)    ............................. 2002-284590

(51) Int. Cl.
*G09G 5/00*    (2006.01)

(52) U.S. Cl. .................................... 345/173

(58) Field of Classification Search ........ 345/173–178; 178/18.03, 18.05–18.07
See application file for complete search history.

(56) References Cited

U.S. PATENT DOCUMENTS

| 6,091,406 | A  | * | 7/2000  | Kambara et al. | ........... 345/177 |
| 6,118,435 | A  | * | 9/2000  | Fujita et al.  | ................. 345/173 |
| 6,304,251 | B1 | * | 10/2001 | Ito et al.     | ...................... 345/173 |
| 6,522,322 | B1 | * | 2/2003  | Maeda et al.   | ................ 345/173 |
| 6,608,618 | B2 | * | 8/2003  | Wood et al.    | ................. 345/173 |
| 2001/0015597 | A1 | * | 8/2001 | Matsui et al. | ............... 310/369 |
| 2001/0024076 | A1 | * | 9/2001 | Wajima et al. | .............. 310/348 |
| 2003/0067449 | A1 |   | 4/2003  | Yoshikawa et al. | |

FOREIGN PATENT DOCUMENTS

JP    2003-122507 A1    4/2003

* cited by examiner

*Primary Examiner*—Amr A. Awad
*Assistant Examiner*—Stephen G Sherman
(74) *Attorney, Agent, or Firm*—Darby & Darby

(57) ABSTRACT

A touch panel of the present invention in which a piezoelectric substrate is fixed to a movable plate or a supporting substrate has a reduced weight, size, and thickness by providing simpler wiring. The touch panel comprises: a movable plate having an input manipulation surface; a supporting substrate, disposed with a slight insulation gap from the movable plate, for supporting the movable plate from a back surface thereof; conductive layers on the movable plate and the supporting substrate on their respective opposing surfaces; and a piezoelectric substrate fixed to the movable plate or the supporting substrate. A pair of driving electrodes on the piezoelectric substrate are fixed to respective opposing surfaces of the piezoelectric substrate. A conductive layer electrode of the movable plate, a conductive layer electrode of the supporting substrate, and the pair of driving electrodes of the piezoelectric substrate are withdrawn integrally using a single connector tail.

14 Claims, 7 Drawing Sheets

TOUCH PANEL

BACKGROUND OF THE INVENTION

1. Field of the Invention

The present invention relates to a wiring structure of a touch panel used in a touch-panel input device that gives a feeling of input manipulation to a manipulator who presses a movable plate, since the movable plate being pressed or a supporting substrate supporting the movable plate is allowed to vibrate. In particular, the present invention relates to a wiring structure of a touch panel that allows the movable plate or the supporting substrate to vibrate using a piezoelectric substrate.

2. Description of the Related Art

A touch panel is used in a touch-panel input device. The touch-panel input device is a device in which a movable plate and a supporting substrate are deposited with a slight insulation gap between conductive layers formed on their respective opposing surfaces. When the movable plate is pressed, the touch-panel input device electrically detects that the opposing conductive layers come in contact with each other at the pressed position and outputs the pressed position data to each processing device.

The touch-panel input device of this kind has a lamination structure in which the movable plate and the supporting substrate are deposited with a slight insulation gap in between. Hence, the pressing stroke of the movable plate is in an extremely small range from tens to hundreds microns, which makes it difficult to give a feeling of input manipulation to the manipulator. To eliminate this inconvenience, a force feedback type touch panel is adopted, in which the movable plate or the supporting substrate is allowed to vibrate when the movable plate is pressed, so that the manipulator has a feeling of input manipulation at his or her fingertip when pressing the movable plate.

The applicant of the present application filed earlier another patent application (Japanese Patent Application No. 2001-312399) describing the invention as follows, which is related to a touch panel that allows the movable plate or the supporting substrate to vibrate in such a manner that the manipulator can detect the vibration, using a simple driving circuit.

That is, the patent application of the previous invention discloses a touch-panel input device arranged in such a manner that a pair of driving electrodes is fixed to the respective opposing surfaces of the piezoelectric substrate, and the piezoelectric substrate is fixed to the movable plate or the supporting substrate directly or through the driving electrodes. Thus, upon detection of pressing on the input manipulation surface, the movable plate or the supporting substrate is allowed to vibrate by the piezoelectric substrate that expands and contracts in association with application of a driving voltage to the pair of driving electrodes.

The present invention relates to an improvement of the wiring structure of the touch panel of the previous invention described in the above patent application.

A touch panel comprises the movable plate on the back surface of which is formed a conductive layer and a supporting substrate on the top surface of which is formed a conductive layer with a slight wiring gap in between, and the piezoelectric substrate is fixed to the movable plate or the supporting substrate. For a touch panel having such a structure, it is necessary to withdraw a wiring to the movable plate and the supporting substrate and a driving wiring for the piezoelectric substrate.

When these wirings are withdrawn separately and connected to connectors, for example, when two piezoelectric substrates are provided on either end of the supporting substrate, three connectors are necessary in total; moreover, the wiring becomes complicated.

Accordingly, the weight and the size of the touch panel cannot be reduced sufficiently.

Also, neither the structure of merely sandwiching the piezoelectric substrate between the movable plate and the supporting substrate nor the method of fixing the piezoelectric substrate to the back surface of the supporting substrate can reduce the thickness of the touch panel sufficiently.

SUMMARY OF THE INVENTION

It is therefore an object of the present invention to provide a touch panel structure that can effectively reduce the weight and the size, and further the thickness of a touch panel by providing a simpler wiring to the touch panel in which a piezoelectric substrate is fixed to a movable plate or a supporting substrate.

According to an aspect of the invention, a touch panel includes: a movable plate having an input manipulation surface on a main surface thereof; a supporting substrate, disposed with a slight insulation gap from the movable plate, for supporting the movable plate from a back surface thereof; conductive layers formed on the movable plate and the supporting substrate on their respective opposing surfaces; and a piezoelectric substrate fixed to at least one of the movable plate and the supporting substrate and provided with a pair of driving electrodes fixed to respective opposing surfaces thereof. In the touch panel, a conductive layer electrode of the movable plate, a conductive layer electrode of the supporting substrate, and the pair of driving electrodes of the piezoelectric substrate are withdrawn integrally using a single connector tail.

Herein, "to withdraw integrally using a single connector tail" means that a plurality of connectors are not connected separately to the touch panel.

Also, the connector tail is a component obtained by forming a copper-foil plated wiring pattern on an insulative tail base material, such as polyethylene terephthalate (PET), and then covering the wiring pattern with a tail protection sheet material.

According to the invention, the conductive layer electrode of the movable plate, the conductive layer electrode of the supporting substrate, and the pair of driving electrodes of the piezoelectric substrate are withdrawn integrally using the single connector tail in contrast to the conventional method by which leads from the conductive electrodes of the movable plate and the supporting substrate and a lead used to apply a voltage to the driving electrodes of the piezoelectric substrate are provided separately and connected to their respective connectors. Consequently, the number of components can be reduced and the structure can be simpler, which can in turn reduce the weight and the size of the touch panel.

According to another aspect of the invention, when the electrodes are withdrawn integrally using a single connector tail, the connectors are withdrawn integrally by providing a cut to a single connector tail base material to be divided into a portion to be connected to the conductive layer electrodes of the movable plate and the supporting substrate and a portion to be connected to the pair of driving electrodes formed on the respective opposing surfaces of the piezoelectric substrate.

By providing a cut in a connecting portion of the tail base material of the connector tail in this manner, it is possible to absorb a step between the movable plate or the supporting substrate and the piezoelectric substrate in the thickness direction.

In other words, according to this aspect of the invention, by providing a cut to the single connector tail base material, it is possible to withdraw the electrodes integrally using, for example, a standard connector tail having eight lines in a single tail base material.

According to another aspect of the invention, one of the pair of electrodes formed on the respective opposing surfaces of the piezoelectric substrate is folded back at one end in a longitudinal direction to be provided on a same surface of the piezoelectric substrate where the other electrode is provided, with a gap in between. Consequently, the pair of the electrodes can be connected to the leads on one surface of the piezoelectric substrate.

In other words, according to this aspect of the invention, one of the pair of electrodes formed on the respective opposing surfaces of the piezoelectric substrate is folded back at one end in a longitudinal direction to be provided on a same surface of the piezoelectric substrate where the other electrode is provided, with a gap in between. Consequently, lead wirings of the both electrodes can be withdrawn from one surface of the piezoelectric substrate, which can in turn reduce the thickness of the touch panel structure.

In a case where a cut is provided in a connecting portion of the connector tail or the connecting portion is branched for the respective portions, the connector tail can be connected to the both surfaces of the piezoelectric substrate through direct soldering or using a conductive bonding agent.

In such a case, the need to fold back one of the electrodes of the piezoelectric substrate can be eliminated.

According to another aspect of the invention, a notch portion is provided in an edge portion of the supporting substrate or a concave portion is formed in a side portion of the supporting substrate, and the piezoelectric substrate is provided in the notch portion or the concave portion. Consequently, the thickness of the touch panel can be reduced.

In other words, according to this aspect of the invention, the piezoelectric substrate thinner than the supporting substrate is used, and the notch portion is provided in the edge portion of the supporting substrate or the concave portion is formed in the side portion of the supporting substrate, and the piezoelectric substrate is accommodated in the notch portion or the concave portion. Consequently, the thickness of the entire touch panel product can be reduced; moreover, because a protrusion formed by the piezoelectric substrate can be eliminated, flaws or damage of the product caused by the protrusion can be prevented.

According to another aspect of the invention, one of the pair of electrodes formed on the respective opposing surfaces of the piezoelectric substrate is folded back at one end in a longitudinal direction to be provided on a same surface of the piezoelectric substrate where the other electrode is provided, with a gap in between; a pair of lead wiring patterns is formed on a back surface of the supporting substrate through conductive printing; and the pair of electrodes of the piezoelectric substrate is bonded to one end of the pair of lead wiring patterns using a conductive bonding agent, and the connector tail is connected to the other end through thermocompression.

By providing the wiring patterns through conductive printing on the back surface of the supporting substrate in this manner, the connector tail can be connected to the respective electrodes through thermocompression using the wiring patterns, which can contribute to a reduction of the touch panel in size.

In other words, according to this aspect of the invention, the pair of lead wiring patterns is formed on the back surface of the supporting substrate through conductive printing, so that one of the pair of wiring patterns can be connected to the piezoelectric substrate and the other is connected to the connector tail through thermocompression. Consequently, the routing structure from the respective electrodes can be simpler, and hence the size of the product can be reduced.

With the structure in which the piezoelectric substrate is fixed to the back surface of the supporting substrate as described above, the width of a spacer member (adhesive agent layer) can be reduced in comparison with a case where the piezoelectric substrate is sandwiched between the movable plate and the supporting substrate, which makes it possible to secure a larger effective area of the touch panel.

According to another aspect of the invention, the lead wiring is shared and made simpler. To be more concrete, a touch panel includes: a movable plate having an input manipulation surface on a main surface thereof; a supporting substrate, disposed with a slight insulation gap from the movable plate, for supporting the movable plate from a back surface thereof; conductive layers formed on the movable plate and the supporting substrate on their respective opposing surfaces; and a piezoelectric substrate fixed to at least one of the movable plate and the supporting substrate and provided with a pair of driving electrodes fixed to respective opposing surfaces thereof. In the touch panel, a conductive layer electrode of one of the movable plate and the supporting substrate is connected to the electrodes of the piezoelectric substrate, and leads from at least one of the movable plate and the supporting substrate are formed using a connector tail.

In other words, according to this aspect of the invention, by providing a structure in which the pair of the electrodes of the piezoelectric substrate is connected to the conductive layer electrode of the movable plate or the supporting substrate, part of the driving electrode wiring of the piezoelectric substrate can be shared with the lead of the movable plate or the supporting substrate, which can in turn reduce the weight and the size of the touch panel.

BRIEF DESCRIPTION OF THE DRAWINGS

These and other objects and advantages of the present invention will become clear from the following description with reference to the accompanying drawings, wherein:

FIG. 2 is a view showing an embodiment of a connecting structure of a connector tail of a touch panel or the like;

DETAILED DESCRIPTION OF THE PREFERRED EMBODIMENTS

Figure 1:
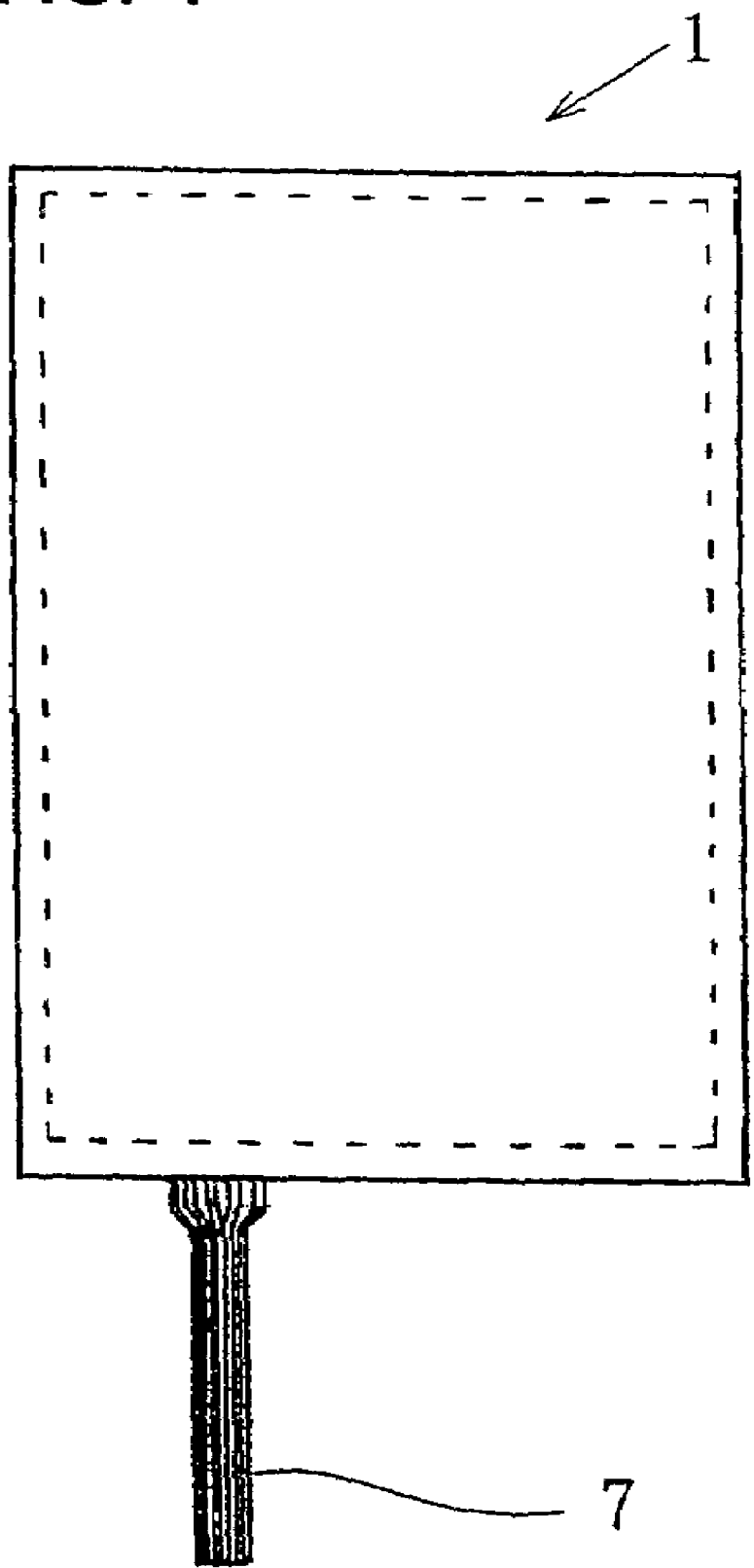
FIG. 1 is a view showing an outward appearance of a touch panel.

FIG. 1 is a view showing an outward appearance of a touch panel 1 of the invention. Wiring is provided by leading a single connector tail 7 from the touch panel 1.

Figure 2:
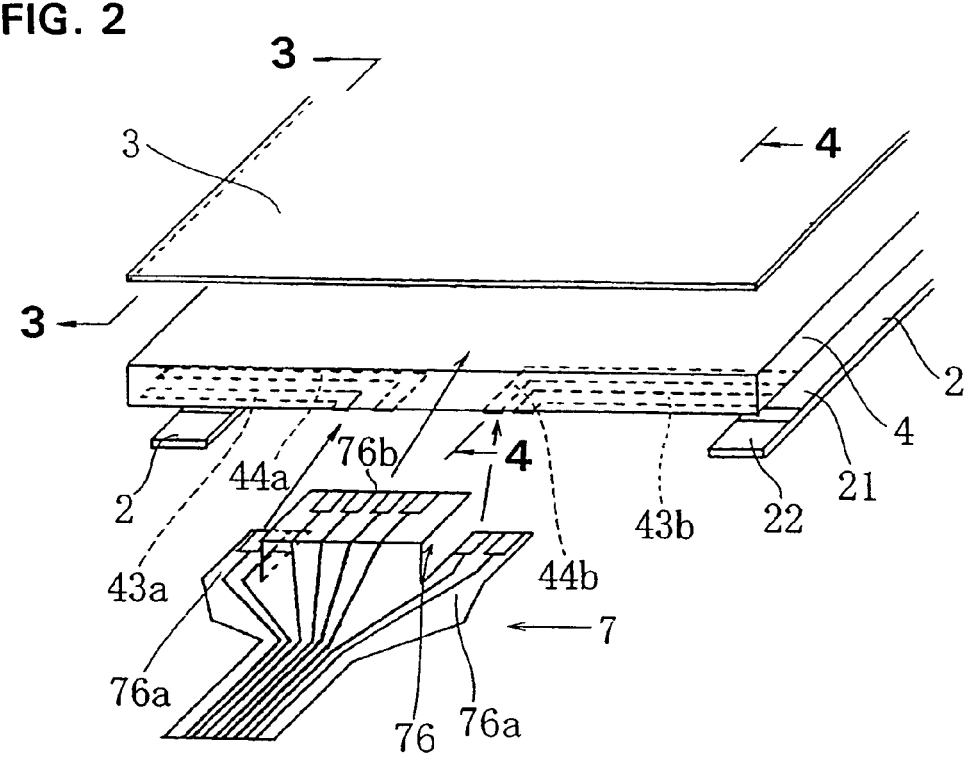
Figure 3:
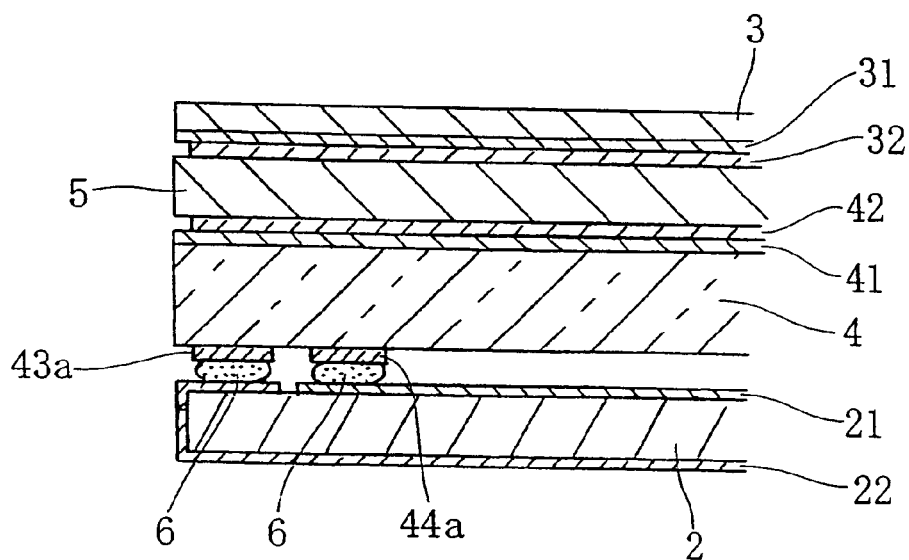
FIG. 3 is a cross section taken along the line 3—3 of FIG. 2 of a portion of the piezoelectric substrate.
Figure 4:
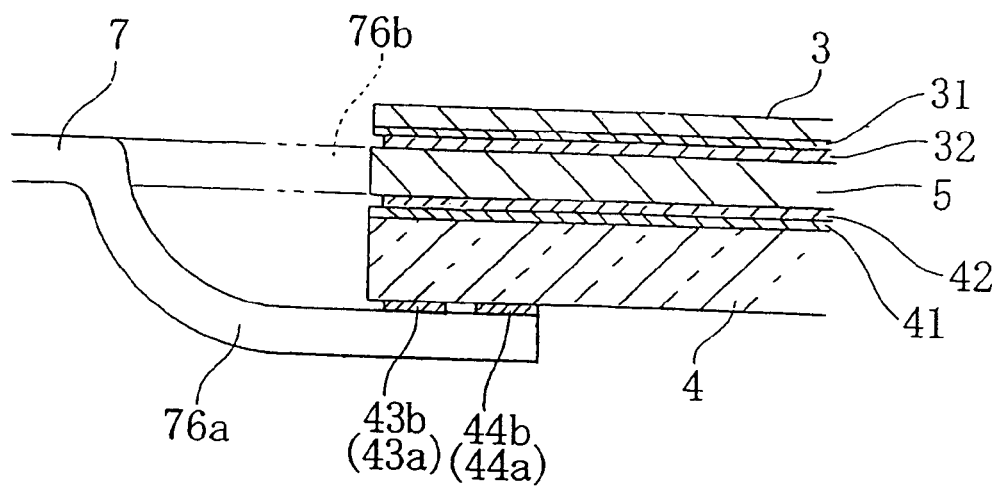
FIG. 4 is a cross section taken along the line 4—4 of FIG. 2 of a connector tail connecting portion.

FIG. 2 is a view showing a wiring structure of a connector tail portion. FIG. 3 is a cross section, taken along the line 3—3 of FIG. 2, showing details of the wiring structure. FIG. 4 is a cross section, taken along the line 4—4 of FIG. 2, showing details of the wiring structure.

A movable plate 3 is a molded flexible rectangular sheet made of transparent synthetic resin, and PET (polyethylene terephthalate) is used herein.

The movable plate 3 can be made of an arbitrary material as long as it can slightly bend toward a supporting substrate 4 described below. It should be noted, however, that in the case of making a visible display portion (not shown) formed inside the supporting substrate 4 like in this embodiment, the supporting substrate 4 is made of a transparent material. Alternatively, in a case where rigidity of a certain degree is needed, a glass substrate or an acrylic plate can be used, and in a case where flexibility is desired, PC (polycarbonate), PES (polyether sulfone), PI (polyimide), etc., can be used.

A transparent hard coating agent (not shown) is applied on the surface of the movable plate 3 to protect the top surface to be used as the input manipulation surface.

Also, the supporting substrate 4 is a transparent substrate, which is a molded rectangular thin plate made of soda lime glass to have the same contour as that of the movable plate 3.

The supporting substrate 4 is a substrate that supports the movable plate 3 to be pressed from the back surface thereof, and for this reason, rigidity of a certain degree is needed. It should be noted, however, that the supporting substrate 4 is not necessarily made of a transparent material when the display portion is not provided inside.

The supporting substrate 4 is not limited to a glass plate, and can be a plate having rigidity of a certain degree. For example, a plastic plate, such as an acrylic substrate, and a metal plate made of aluminum, iron, etc., can be used.

The movable plate 3 and the supporting substrate 4 are deposited with a slight gap in between using a spacer member 5 (e.g., adhesive agent layer) interposed in between along the periphery.

A movable conductive layer 31 and an immovable conductive layer 41, each being a transparent conductive film, are fixed to the movable plate 3 and the supporting substrate 4 on their respective opposing surfaces in a constant film thickness.

An electrode 32 is formed on the movable conductive layer 31 for the use of this movable conductive layer.

The electrode 32 is an elongate strip-like conductive thin plate composed of silver and formed through printing.

An electrode 42 is formed on the immovable conductive layer 41 of the supporting substrate 4.

The electrode 42 is also an elongate strip-like conductive thin plate composed of silver and formed through printing.

On the back surface of the supporting substrate 4 are formed electrodes 43a, 44a, 43b and 44b, which are elongate strip-like conductive thin plates composed of silver and formed through printing, used to link the connector tail 7 to the driving electrodes of a piezoelectric substrate 2 described below.

Dot spacers (not shown) made of insulative synthetic resin are fixed onto the immovable conductive layer 41 at regular intervals.

The dot spacers are provided to prevent the movable conductive layer 31 and the immovable conductive layer 41 from coming in contact with each other erroneously when the manipulator's hand touches part of the input manipulation surface unintentionally. The dot spacers are lower in height than the gap between the movable conductive layer 31 and the immovable conductive layer 41 spaced apart by the spacer member (e.g., adhesive agent layer) 5.

The piezoelectric substrate 2 is a single-layer substrate made of a piezoelectric material including a piezoelectric mono-crystal, piezoelectric ceramics represented by PZT (lead zirconate titanate), polyvinylidene fluoride (PVDF), etc. The piezoelectric substrate 2 used herein is a piezoelectric ceramics plate made of a most extensively used PZT-based piezoelectric material and having a mechanical strength. The piezoelectric substrate 2 is made into an elongate strip-like thin plate along the side edges of the immovable conductive layer 41.

Since the piezoelectric substrate 2 is a thin plate, a large quantity of deformation is given and is arranged to operate on a low voltage.

A pair of driving electrodes 21 and 22 used to apply a driving voltage to the piezoelectric substrate 2 is formed by depositing a conductive metal material onto the respective opposing surfaces, that is, both the main and back surfaces of the piezoelectric substrate 2, through vapor deposition, screen printing, etc., followed by fixation through baking or the like.

Of the pair of the driving electrodes 21 and 22, the driving electrode 22 covering the back surface of the piezoelectric substrate 2 is folded back to the main surface at one end in the longitudinal direction of the piezoelectric substrate 2, and is thereby exposed to the main surface side with a gap from the other driving electrode 21 covering the main surface so as not to come in contact with each other.

Figure 5:
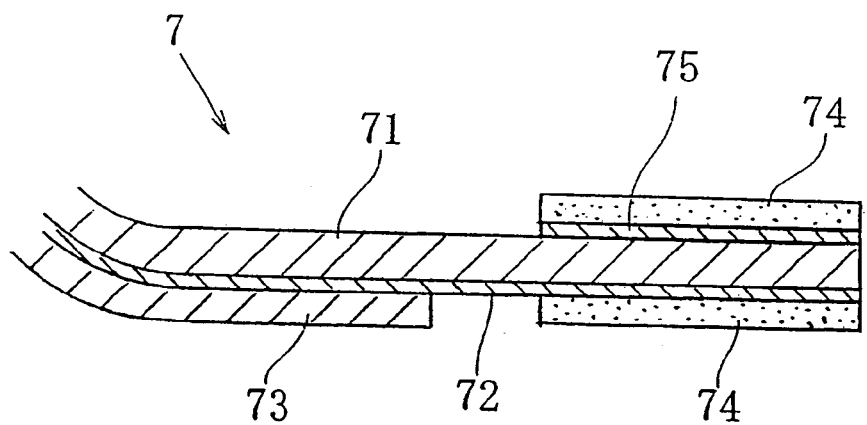
FIG. 5 is a view showing an embodiment of a detailed structure of a connecting portion of the connector tail.

As shown in FIG. 5, the connector tail 7 is obtained by forming a lead wiring 72 through copper-foil plating or the like on a tail base material 71 made of PET or the like, and covering the surface of the lead wiring 72 with a protection sheet material 73.

A connecting portion of the connector tail 7 is provided with anisotropic conductive films 74, which establish an electrical connection by being connected to the movable conductive layer electrode 32 or to the immovable conductive layer electrode 42 through thermocompression. As shown in FIG. 5, a conductive thin plate 75 composed of silver and formed through printing is interposed between the anisotropic conductive film 74 and the tail base material 71 on the connecting portion of the connector tail 7.

An example of the wiring structure will now be explained with reference to FIG. 2.

For example, notch portions 76 are made in the connecting portion of the 8-line connector tail 7, then piezoelectric substrate connecting portions 76a are connected respectively to the electrodes 43a and 44a and the electrodes 43b and 44b on the back surface of the supporting substrate 4 through thermocompression, and a movable plate and supporting substrate connecting portion 76b of the connector tail 7 is connected to the electrodes 32 and 42 by being sandwiched between the movable plate 3 and the supporting substrate 4 (see FIG. 4).

FIG. 3 shows a cross section taken along the line 3—3 of FIG. 2 of a portion of the piezoelectric substrate.

The driving electrodes 21 and 22 of the piezoelectric substrate 2 are bonded respectively to the electrodes 43a and 43b formed on the back surface of the supporting substrate 4 through printing, using a conductive bonding agent 6.

Also, at the connecting portion of the connector tail 7, ends of the electrodes (43b and 44b) and (43a and 44a) formed on the back surface of the supporting substrate 4 are connected to the piezoelectric substrates 2, and as shown in FIG. 4, the other ends of the electrodes (43b and 44b) and (43a and 44a) are connected to the piezoelectric substrate connecting portions 76a of the connector tail 7 through thermocompression.

The electrodes 32 and 42 of the movable plate 3 and the supporting substrate 4 are connected to the connector tail 7 by the movable plate and supporting substrate connecting portion 76b of the connector tail 7, which is sandwiched in a gap therebetween as indicated by a chain double-dashed line of FIG. 4.

Figure 6:
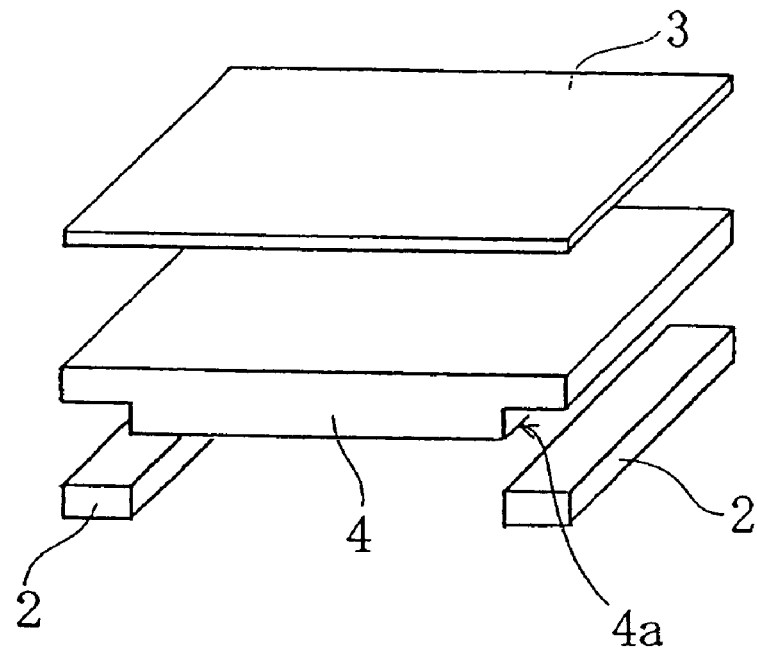
FIG. 6 is a view showing an embodiment when notch portions are provided in the back surface of a supporting substrate.
Figure 7:
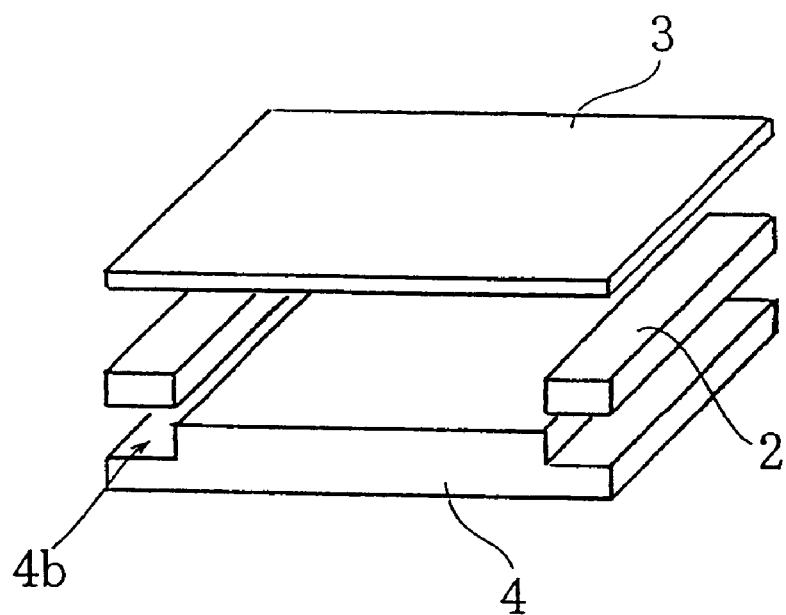
FIG. 7 is a view showing an embodiment when notch portions are provided in the main surface of the supporting substrate.
Figure 8:
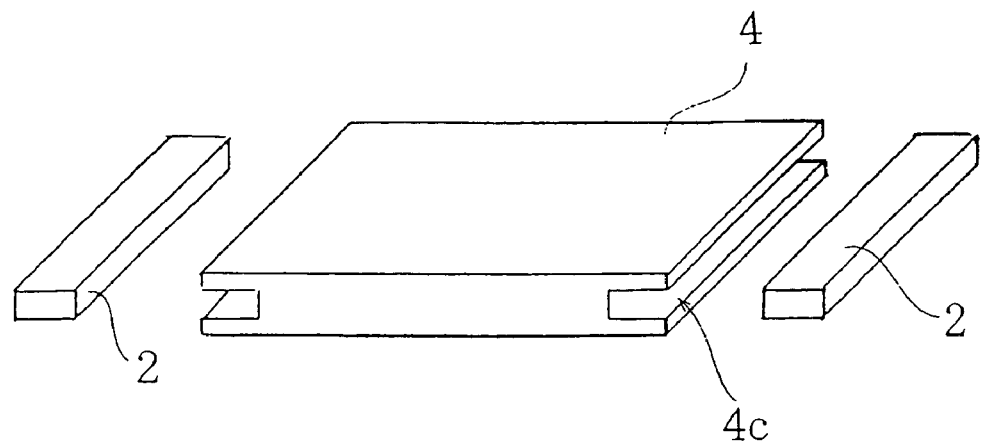
FIG. 8 is a view showing an embodiment when concave portions are formed in side portions of the supporting substrate.

The piezoelectric substrate 2 may be fixed to the supporting substrate 4 in the following manner when fixed to the back surface of the supporting substrate 4 as shown in FIG. 2. For example, as shown in FIG. 6 through FIG. 8, notch portions 4a or 4b are provided in the edge portions of the supporting substrate 4 or concave portions 4c are formed in the side portions of the supporting substrate 4, and the piezoelectric substrate 2 is immovably accommodated in these portions. This arrangement can reduce the thickness of the touch panel.

Figure 9:
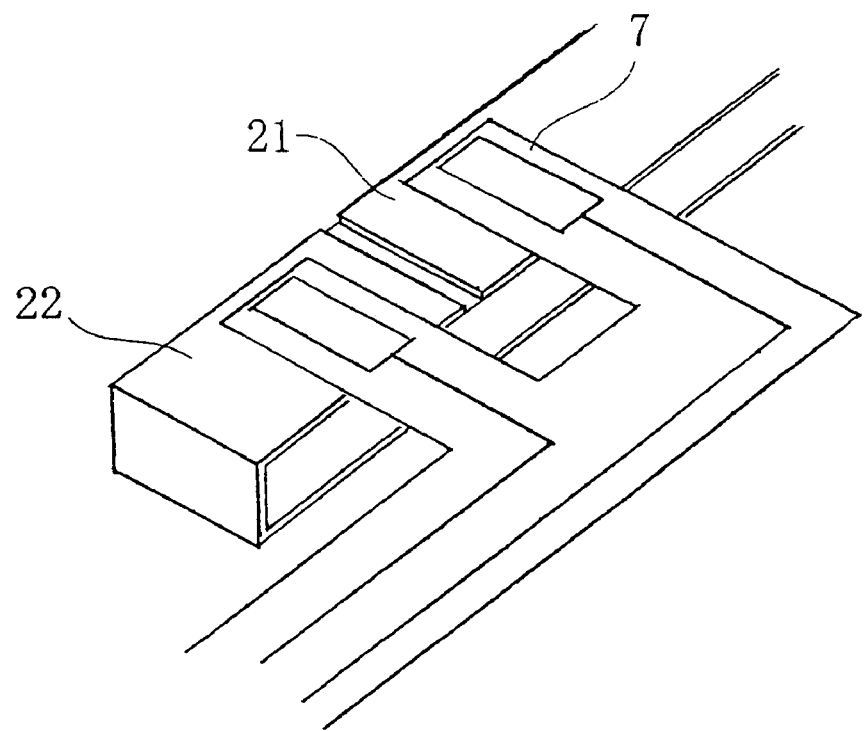
FIG. 9 is a view showing an embodiment when connecting a connector tail to a piezoelectric substrate.

The piezoelectric substrate 2 may be connected to the connector tail 7 by bonding the connecting portion of the connector tail 7 to the driving electrodes 21 and 22 of the piezoelectric substrate 2 through direct soldering or with a conductive bonding agent 6 as shown in FIG. 3 by omitting a conductive thin plate composed of silver and formed through printing as shown in FIG. 9.

Figure 10:
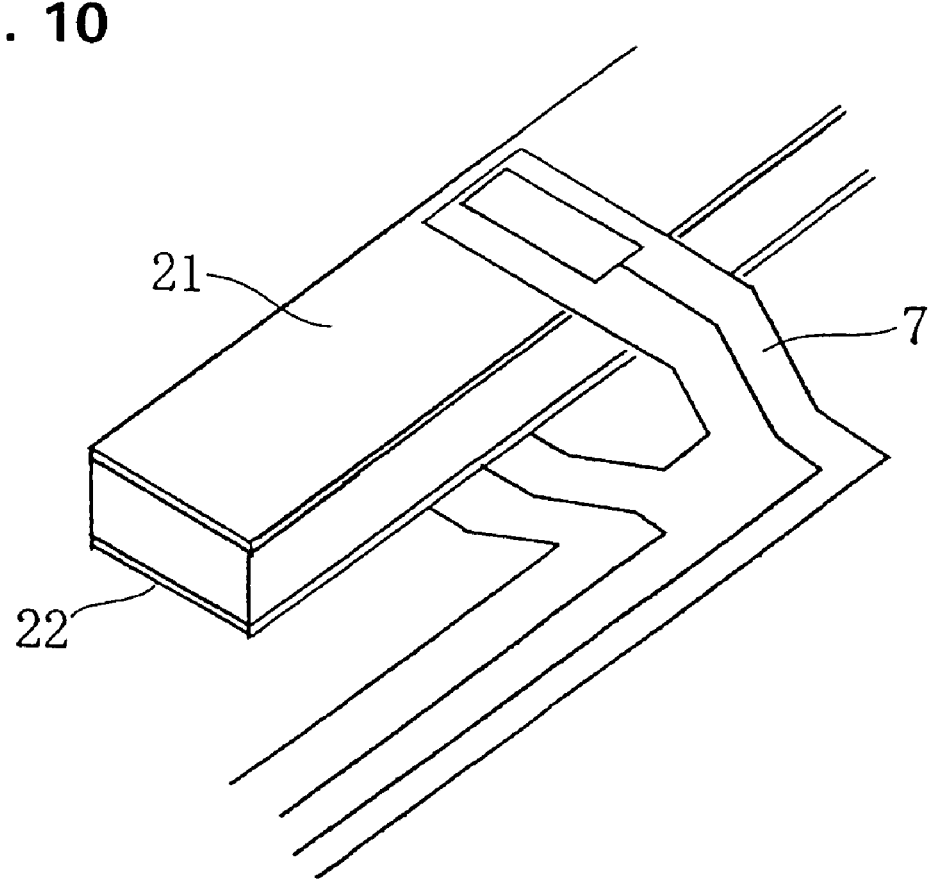
FIG. 10 is a view showing another embodiment when connecting the connector tail to the piezoelectric substrate.

In this case, by providing a cut to the connector tail 7 as shown in FIG. 10, the connector tail 7 can be connected directly to both the main and back surfaces without the need to provide a folding portion to the electrode 22 of the piezoelectric substrate 2.

Figure 11:
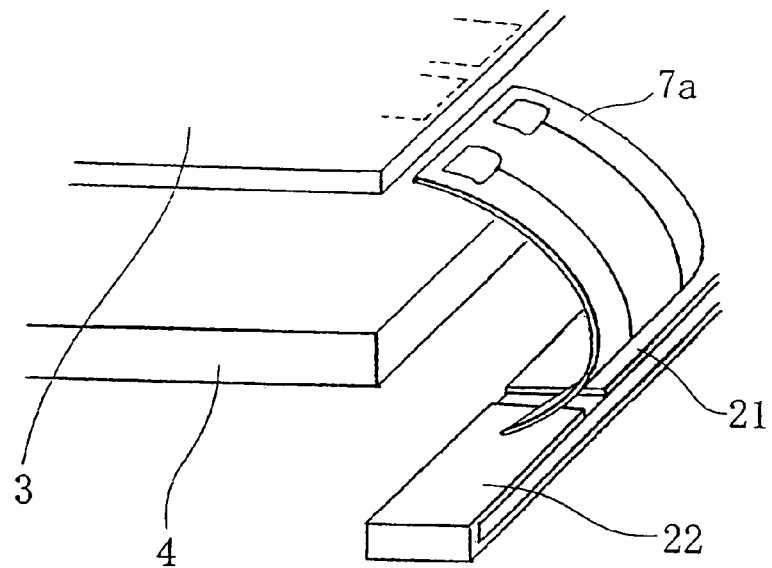
FIG. 11 is a view showing an embodiment when connecting driving electrodes of the piezoelectric substrate to an electrode of a movable plate.

Alternatively, as shown in FIG. 11, the driving electrodes 21 and 22 of the piezoelectric substrate 2 may be connected to the electrode 32 of the movable plate 3 through a connecting plate 7a, so that a single connector tail 7 is connected to the movable plate 3 and the supporting substrate 4.

Figure 12:
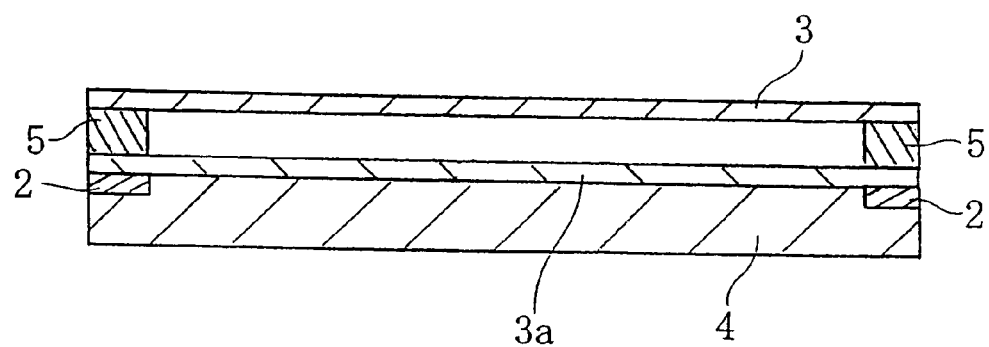
FIG. 12 is a view showing an embodiment of a touch panel structure having a double-film structure.

In the case of a type provided with the notch portions 4b in the supporting substrate 4, as shown in FIG. 12, a thin film of substrate 3a may be formed on the supporting substrate 4, so that the movable plate 3 is formed on the substrate 3a with the spacer member 5 being interposed in between.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. A touch panel comprising:
   a movable plate having an input manipulation surface on a main surface thereof;
   a supporting substrate, disposed with a slight insulation gap from said movable plate, for supporting said movable plate from a back surface thereof;
   conductive layers formed on said movable plate and said supporting substrate on their respective opposing surfaces;
   a piezoelectric substrate fixed to said supporting substrate and provided with a pair of driving electrodes fixed to respective opposing surfaces thereof; and
   a connector tail comprising:
   a first portion connected to a conductive layer electrode of the movable plate and a conductive layer electrode adjacent to a main surface of the supporting substrate; and
   a second portion connected to the pair of driving electrodes adjacent to a back surface of the supporting substrate, the first and second portions of the connector tail being displaced relative to each other to span a height of the supporting substrate,
   wherein the conductive layer electrode of said movable plate, the conductive layer electrode of said supporting substrate, and said pair of driving electrodes of said piezoelectric substrate are withdrawn integrally using the single connector tail.

2. The touch panel according to claim 1, wherein the electrodes are withdrawn integrally by providing a cut to a tail base material of said connector tail to be divided into a portion to be connected to the conductive layer electrodes of said movable plate and said supporting substrate and a portion to be connected to the pair of driving electrodes formed on the respective opposing surfaces of said piezoelectric substrate.

3. The touch panel according to claim 2, wherein one of said pair of driving electrodes formed on the respective opposing surfaces of said piezoelectric substrate is folded back at one end in a longitudinal direction to be provided on a same surface of said piezoelectric substrate where the other one of said pair of driving electrodes is provided, with a gap in between.

4. The touch panel according to claim 2, wherein:
   one of said pair of driving electrodes formed on the respective opposing surfaces of said piezoelectric substrate is folded back at one end in a longitudinal direction to be provided on a same surface of said piezoelectric substrate where the other one of said pair of driving electrodes is provided, with a gap in between;
   a pair of lead wiring patterns is formed on a back surface of said supporting substrate through conductive printing; and
   said pair of driving electrodes of said piezoelectric substrate is bonded to one end of said pair of lead wiring patterns using a conductive bonding agent, and said connector tail is connected to the other end of said pair of lead wiring patterns through thermocompression.

5. A The touch panel according to claim 1, further comprising:
   a notch portion provided in said supporting substrate, wherein said piezoelectric substrate is provided in said notch portion.

6. The touch panel according to claim 5, wherein said notch portion is provided in an edge portion of a back surface of said supporting substrate.

7. The touch panel according to claim 5, wherein the notch portion is in the shape of a concave portion that is formed in a side portion of said supporting substrate.

8. The touch panel according to claim 5, wherein said notch portion is provided in an edge portion of a main surface of said supporting substrate.

9. The touch panel according to claim 5, wherein said piezoelectric substrate is fully contained within said notch portion provided in said supporting substrate.

10. A touch panel comprising:
    a movable plate having an input manipulation surface on a main surface thereof;
    a supporting substrate, disposed wit a slight insulation gap from said movable plate, for supporting said movable plate from a back surface thereof;
    conductive layers formed on said movable plate and said supporting substrate on their respective opposing surfaces; and
    a piezoelectric substrate fixed to at least one of said movable plate and said supporting substrate and provided with a pair of driving electrodes fixed to respective opposing surfaces thereof; and
    a connector tail comprising:
    a first portion connected to a first electrode of the pair of driving electrodes of the piezoelectric substrate; and
    a second portion connected to a second electrode of the pair of driving electrodes of the piezoelectric substrate, the first and second portions of the connector tail being displaced relative to each other to span a height of the piezoelectric substrate,
    wherein a conductive layer electrode of one of said movable plate and said supporting substrate is connected to the driving electrodes of said piezoelectric substrate.

11. The touch panel according to claim 10, further comprising:
    a notch portion provided in said supporting substrate, wherein said piezoelectric substrate is provided in said notch portion.

12. The touch panel according to claim 11, wherein said notch portion is provided in an edge portion of a main surface of said supporting substrate.

13. The touch panel according to claim 11, wherein said notch portion is provided in an edge portion of a back surface of said supporting substrate.

14. The touch panel according to claim 11, wherein a the notch portion is in the shape of a concave portion that is formed in a side portion of said supporting substrate.

* * * * *